A. A. RUSSELL.
Implement for Cleaning Horses.
No. 201,051. Patented March 5, 1878.
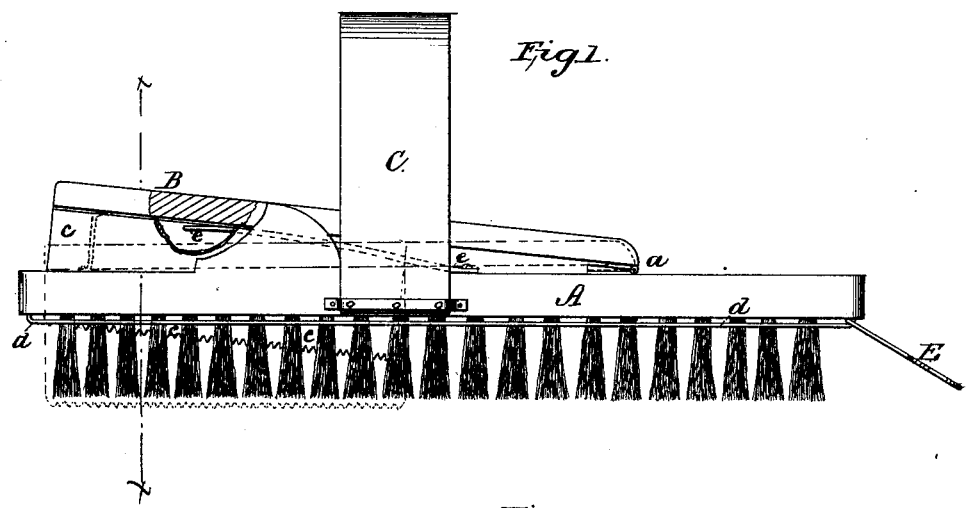
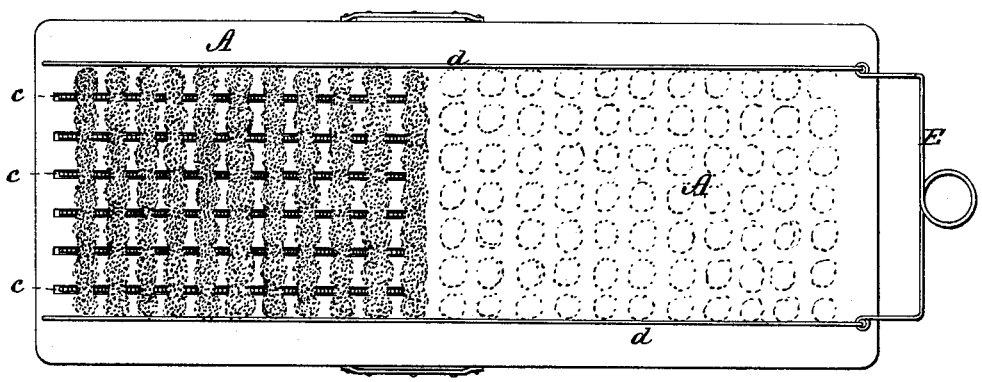
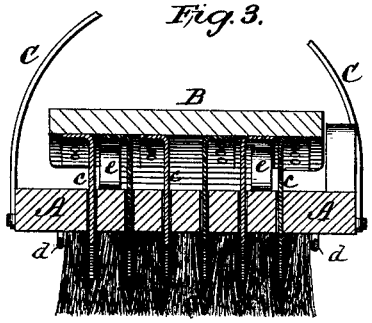
Attest:
James C. Luckey
John Mehler
Inventor:
Abraham A. Russell.

UNITED STATES PATENT OFFICE.

ABRAHAM A. RUSSELL, OF POLO, ILLINOIS.

IMPROVEMENT IN IMPLEMENTS FOR CLEANING HORSES.

Specification forming part of Letters Patent No. 201,051, dated March 5, 1878; application filed July 14, 1877.

*To all whom it may concern:*

Be it known that I, ABRAHAM A. RUSSELL, of Polo, in the county of Ogle and State of Illinois, have invented a new and Improved Device for Cleaning Horses; and I do hereby declare that the following is a full, clear, and exact description of the same.

My invention consists in uniting a horse-brush and curry-comb in such a manner that the teeth of the curry-comb may be caused to project beyond the face of the brush at will, by pressure applied by the fingers of the hand by which the brush is held and operated.

The invention also consists in applying a cleaning device to the brush, as hereinafter described.

In the accompanying drawing, Figure 1 is a side view, with part broken away, of my improved grooming implement. Fig. 2 is a bottom-plan view. Fig. 3 is a cross-section on line $x$ $x$ of Fig. 1.

The brush A is constructed in the usual way. The curry-comb consists of a plate, B, having series of toothed plates $c$ attached to the under side thereof at one end. The other end of said plate is hinged to the back of the brush at $a$, while its toothed or free end is supported upon springs $e$, attached to the brush-back, and located between the toothed plates $c$, as shown in Fig. 3. The teeth enter slots in the back of the brush A, and project on the under side thereof, between the tufts or bunches of bristles.

To use the device, the hand is inserted beneath the strap C, in the ordinary manner, and the fingers will then rest on the raised end of the comb B. The brush may then be used at pleasure, and the comb brought into action, whenever required, by exerting sufficient pressure on the comb with the fingers to depress the spring $e$, and thus cause the serrated ends of toothed plates $c$ to project beyond the free ends of the bristle-tufts, as shown in dotted lines, Fig. 1.

By relaxing the pressure, the toothed plates will recede and the bristles will alone remain in contact with the animal's skin.

The implement is useful for grooming in general, but especially for grooming vicious animals, where it is desirable or necessary to have one hand free to restrain and control them; also for nervous animals having a very sensitive skin, to which the continuous application of a heavy comb is injurious, and perhaps impracticable.

To clean the brush by removing the dandruff, &c., from the ends of the bristle-tufts, I employ a scraper, E, formed of a wire, whose bent ends are attached loosely to parallel guide-wires $d$, attached to the under side of the brush-back, one on each side of the bristles. To clean the brush, the scraper E is slid along the guide-wires $d$ over the free ends of the bristles.

The wire E is bent at its middle to form a loop by which to suspend the implement from a nail, screw, or other form of hanger.

What I claim is—

1. The grooming implement formed of the brush having a hand strap or loop, and provided with slots in one end thereof, and the curry-comb hinged to the back of the brush, and supported upon springs at its free end, as shown and described.

2. The combination of the sliding scraper and guide-wires with the brush, as shown and described.

ABRAHAM A. RUSSELL.

Witnesses:
 JAMES L. LUCKEY,
 JOHN MICKLER.